(12) United States Patent
Tanaka et al.

(10) Patent No.: US 7,429,028 B2
(45) Date of Patent: Sep. 30, 2008

(54) VALVE, EXHAUST GAS RECIRCULATION CONTROL VALVE AND VALVE ASSEMBLING METHOD

(75) Inventors: Tohru Tanaka, Tokyo (JP); Shinichi Kawasaki, Tokyo (JP); Sotsuo Miyoshi, Tokyo (JP); Toshihiko Miyake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/938,821

(22) Filed: Sep. 13, 2004

(65) Prior Publication Data

US 2005/0082507 A1    Apr. 21, 2005

(30) Foreign Application Priority Data

Oct. 17, 2003    (JP) ............................ P2003-357594

(51) Int. Cl.
*F16K 31/44* (2006.01)
*F16J 15/32* (2006.01)
(52) U.S. Cl. ........................................ 251/214; 277/309
(58) Field of Classification Search ................ 251/214, 251/330; 277/308, 309, 315, 596
See application file for complete search history.

(56) References Cited

U.S. PATENT DOCUMENTS

| 3,088,442 | A | * | 5/1963 | Self et al. ................... 277/309 |
| 3,188,048 | A | * | 6/1965 | Sutherland .................. 277/532 |
| 3,300,225 | A | * | 1/1967 | Shepler ...................... 277/584 |
| 3,540,740 | A | * | 11/1970 | Smith ......................... 277/532 |
| 4,082,102 | A | * | 4/1978 | Allen ......................... 137/72 |
| 4,121,838 | A | * | 10/1978 | Sakamaki ................... 277/586 |
| 4,500,097 | A | * | 2/1985 | Sakamoto et al. .......... 277/345 |
| 4,811,960 | A |   | 3/1989 | Stritzke et al. |
| 5,338,005 | A | * | 8/1994 | Stoll .......................... 251/214 |
| 5,607,166 | A | * | 3/1997 | Gorman ..................... 277/436 |
| 6,354,566 | B1 | * | 3/2002 | Smith et al. ................ 251/214 |

FOREIGN PATENT DOCUMENTS

| DE | 195 04 348 A1 | 8/1996 |
| DE | 100 48 499 A1 | 4/2002 |
| EP | 1 235 016 A2 | 8/2002 |
| JP | 2001-304052 A | 10/2001 |
| KR | 1998-048950 | 10/1998 |
| WO | WO 2055913 A2 * | 7/2002 |

* cited by examiner

*Primary Examiner*—Stephen M. Hepperle
*Assistant Examiner*—Andrew J Rost
(74) *Attorney, Agent, or Firm*—Sughrue Mion, PLLC

(57) ABSTRACT

A valve has a housing, a shaft with a valve disc, and a sliding shaft support portion along which the shaft slides, wherein the sliding shaft support portion is provided with a seal member movable and deformable in a certain range.

6 Claims, 5 Drawing Sheets

VALVE, EXHAUST GAS RECIRCULATION CONTROL VALVE AND VALVE ASSEMBLING METHOD

BACKGROUND OF THE INVENTION

1. Field of the Invention

The present invention relates to a valve, an exhaust gas recirculation control valve and a method for assembling the valve, and is suitably applied to a vehicle mounted valve mounted on the car, for example, and particularly to an exhaust gas recirculation control valve.

2. Description of the Related Art

The conventional valve had a clearance between a bearing and a shaft in view of thermal expansion with the sliding shaft as disclosed in JP-A-11-336616.

SUMMARY OF THE INVENTION

In the conventional valve, an exhaust gas, foreign matter or water enters a sliding portion of the shaft or an actuator portion for driving the valve through a clearance in the sliding shaft support portion, degrading the sliding performance of the shaft or the operation performance of the actuator.

This invention has been achieved to solve the above-mentioned problem, and it is an object of the invention to provide a valve in which the exhaust gas, foreign matter or water is prevented from leaking through the sliding shaft support portion and entering the sliding portion or the actuator portion.

According to the invention, there is provided a valve comprising a housing; a shaft with a valve disc which is disposed within the housing; and a sliding shaft support portion along which the shaft slides, wherein the sliding shaft support portion is provided with a seal member movable and deformable in a certain range.

According to the invention, there is provided an exhaust gas recirculation control valve comprising a housing; a shaft with a valve disc for opening or closing an exhaust gas passage, which is disposed within the housing; and a sliding shaft support portion along which the shaft slides, wherein the sliding shaft support portion is provided with a seal member movable and deformable in a certain range, the seal member being made of an elastic member to be deformed according to a pressure in the exhaust gas passage.

According to the invention, there is provided a method for assembling a valve having a housing, a shaft with a valve disc which is disposed within the housing, a sliding shaft support portion along which the shaft slides, and a seal member provided in the sliding shaft support portion to be movable and deformable in a certain range, the method comprising: applying a positive pressure in inserting the shaft into the seal member.

In the valve according to this invention, the sliding shaft support portion is provided with a seal member movable and deformable in a certain range, whereby the seal member has an enhanced sealing performance due to a pressure introduced through a clearance of the shaft.

In the exhaust gas recirculation control valve according to the invention, the sliding shaft support portion is provided with a seal member movable and deformable in a certain range, in which the seal member is made of an elastic member to be deformed according to a pressure in the exhaust gas passage, whereby the sealing performance is enhanced due to a pressure in the exhaust gas passage.

In the method for assembling a valve according to the invention, a positive pressure is applied in inserting the shaft into the seal member, whereby a dislocation of the seal member at the time of assembling is prevented.

BRIEF DESCRIPTION OF THE DRAWINGS

FIG. 2 is an enlarged view of a sliding shaft support portion 9a.

FIG. 5 is an explanatory view for explaining the action situation of a seal when a leakage of exhaust gas, foreign matter or water occurs from the sliding shaft support portion 9a.

DETAILED DESCRIPTION OF THE PREFERRED EMBODIMENTS

One embodiment of the present invention will be described below.

Throughout the drawings, the same or like parts are designated by the same numerals.

First Embodiment

Figure 1:
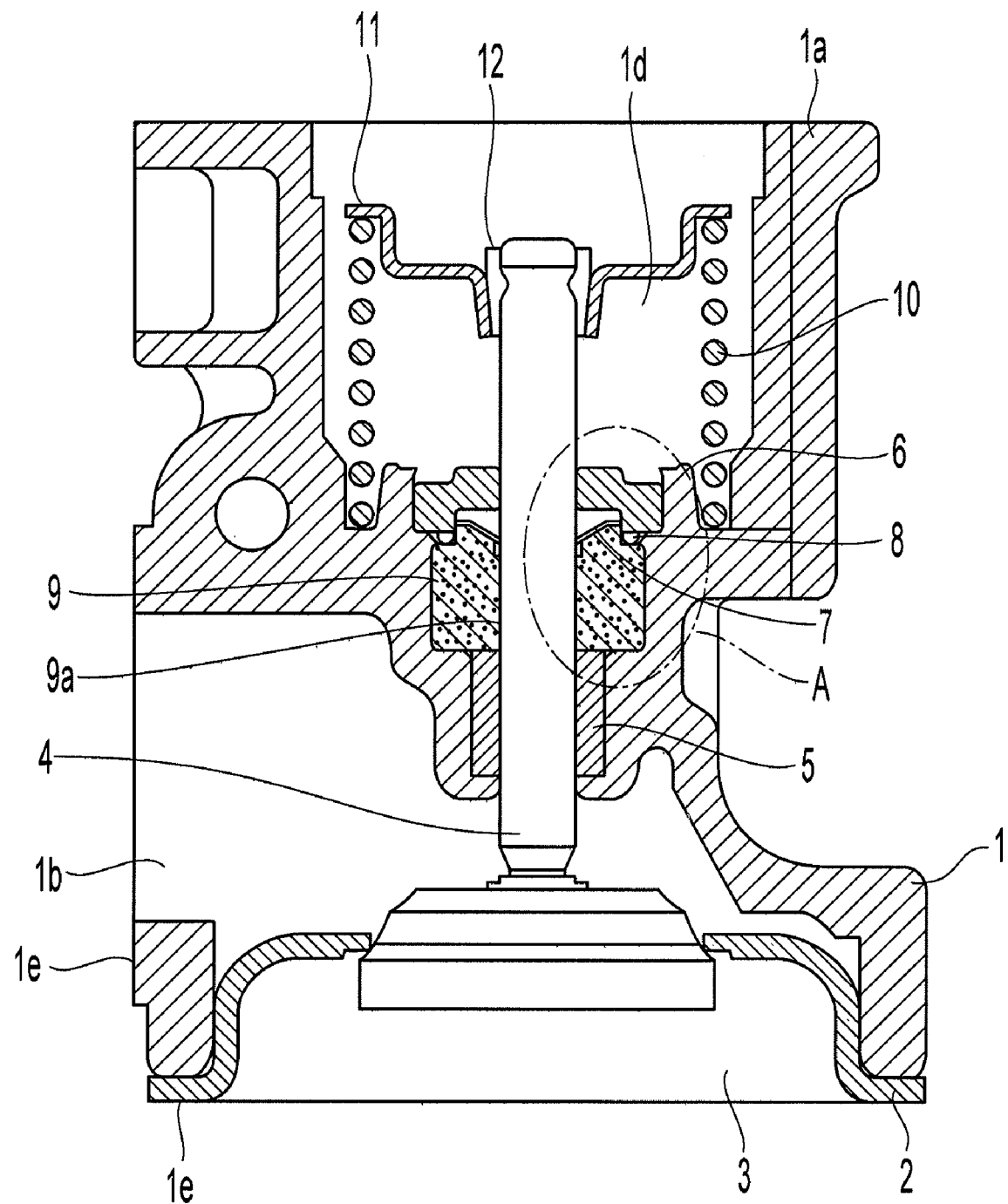
FIG. 1 is an axial cross-sectional view of an exhaust gas recirculation valve according to a first embodiment.

FIG. 1 is an axial cross-sectional view of an exhaust gas recirculation valve according to a first embodiment of the invention.

In FIG. 1, a sliding shaft support component (bushing) 9 like a cylinder and a shaft 4 sliding vertically along the inner circumference of the sliding shaft support component 9 are provided inside a housing 1 having a mounting face 1a on which an actuator such as a motor, not shown, is mounted, and a mounting face 1e on an engine, not shown, and the other components, the shaft 4 being connected to a valve 3 for controlling the flow of exhaust gas and supported by the sliding shaft support portion 9a of the sliding shaft support component 9.

Figure 2:
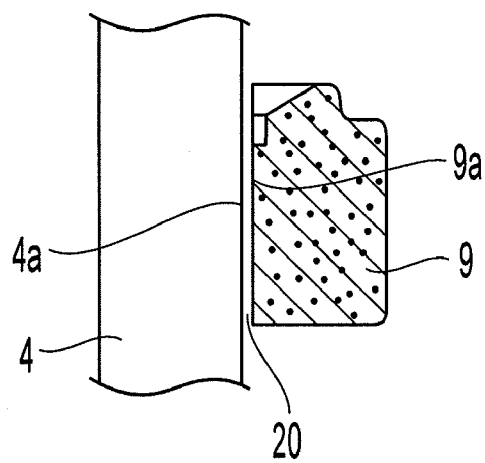

FIG. 2 is a partly enlarged view of the sliding shaft support portion 9a.

The sliding shaft support portion 9a of the sliding shaft support component 9 and the shaft 4a supported by the sliding shaft support portion 9a are made of different materials, and provided with some clearance 20 at the early time, namely at ordinary temperatures from the relationship of a thermal expansion difference at high temperatures. Some clearance is needed even though they are made of same material.

When the exhaust gas recirculation valve according to the invention is activated, namely, when a flow of exhaust gas occurs in the exhaust gas passage inside 1b, the temperatures of the housing 1, the sliding shaft support component 9, the shaft 4 and other parts making up the exhaust gas recirculation valve are all elevated.

At this time, the clearance 20 between the sliding shaft support portion 9a and the shaft 4a is contracted due to thermal expansion of the members on both sides, but because the shaft 4 needs to be slid vertically at high temperatures, some clearance 20, not designed as 0, exists at high temperatures.

Figure 3:
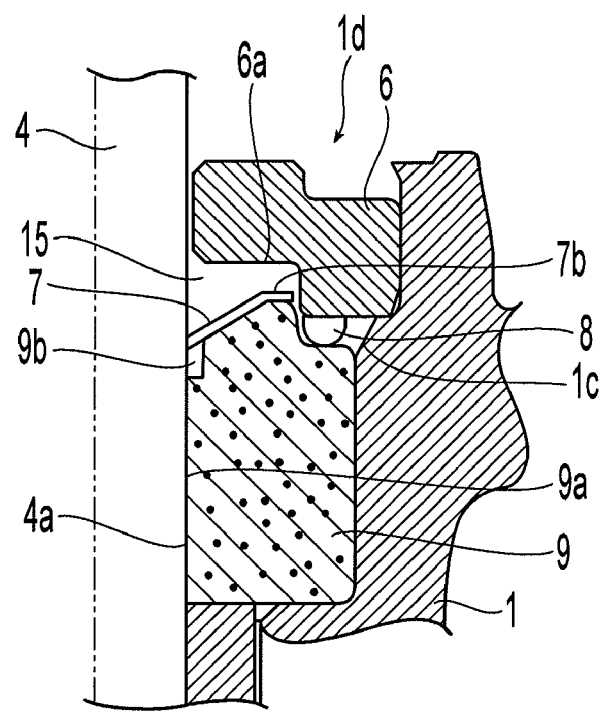
FIG. 3 is an enlarged view of a portion A encircled by the dotted line in FIG. 1.

In this embodiment, to suppress an exhaust gas, foreign matter and water from leaking through the clearance 20 and entering the actuator portion, a seal 7 is provided on an upper part of the sliding shaft support portion 9 and held with a plug 6 and the sliding shaft support portion 9, as shown in FIG. 1 (FIG. 3).

Figure 4:
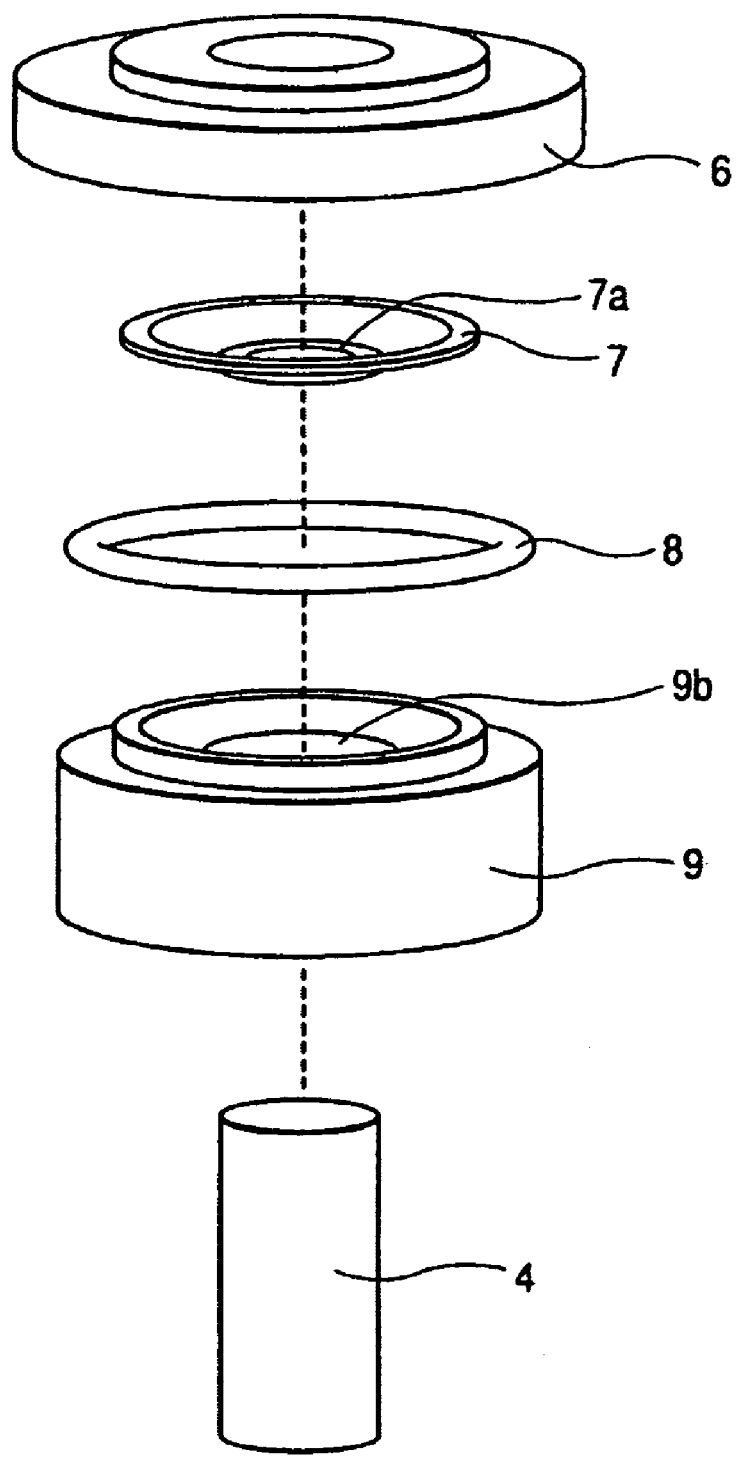
FIG. 4 is a perspective view of each of the parts making up the sliding shaft support portion.

FIG. 3 is an enlarged view of a portion A encircled by the dotted line in FIG. 1, and FIG. 4 is a perspective view of each of the parts making up the sliding shaft support portion.

The seal 7 has a hole 7a opened along the shaft 4, and incorporated between the sliding shaft support component 9 and the plug 6. The seal 7 exists in a space 15 provided, and is movable or deformable to some extent within the space 15 without being secured rigidly. Also, the seal 7 is assembled in contact with the shaft 4 and with reference to the shaft 4. Also, the seal 7 is roughly positioned by the shaft 4 rather than any other member, and is made of a deformable elastic material. In conclusion, even if the shaft 4 is inclined corresponding to the clearance 20, the seal 7 is also moved in accordance with its inclination, because the seal 7 is incorporated along the shaft 4 as above described, whereby the hole 7a in the inner diameter portion is less likely to wear eccentrically.

The plug 6 is secured to the housing 1 to hold the seal 7 and the sliding shaft support component 9 via a ring 8. Also, even if an exhaust gas, foreign matter or water leaks through the sliding shaft support portion 9a, it is prevented from reaching the neighboring housing 1c to damage the housing 1c due to corrosion.

Moreover, the space 15 containing the seal 7 has basically an outside face shaped like a plane, whereby a planar portion 6a and a planar portion 7b of the seal 7 are contacted in the plane to provide a countermeasure against leakage, namely, serve as a seal for keeping the exhaust gas, foreign matter or water from leaking through the sliding shaft support portion 9a.

Also, the sliding shaft support component 9 is provided with an undercut portion, or a groove 9b, thereby preventing the seal 7a from biting.

Figure 5:
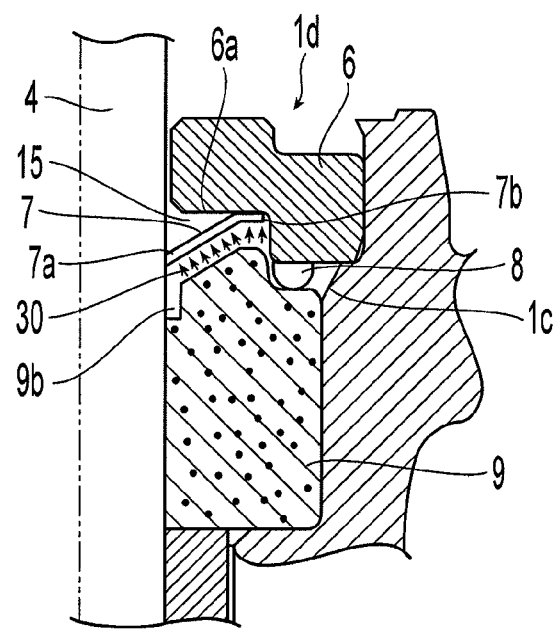

Referring to FIG. 5, the embodiment 1 will be now described.

FIG. 5 is an explanatory view for explaining the action situation of the seal 7 namely, the leakage suppressing situation of the seal 7, where a leakage of exhaust gas, foreign matter or water occurs from the sliding shaft support portion 9a due to a pressure difference produced between the exhaust gas passage inside and outside 1b-1d, when the exhaust gas recirculation valve of the invention is activated to cause a flow of exhaust gas in the exhaust gas passage inside 1b.

When a flow of exhaust gas occurs in the exhaust gas passage inside 1b, a pressure 30 from the sliding shaft support portion 9a is exerted on the lower face of the seal 7 due to a pressure difference between the exhaust gas passage inside and outside 1b-1d. The seal 7 subjected to the pressure 30 is moved to the upper part of the space 15 provided beforehand owing to its pressure or a vertical sliding motion of the shaft 4, so that the seal 7b and the plug 6a, as well as the seal 7a and the shaft 4 are intimately contacted and sealed. Since the housing 1c is also sealed with the ring 8, there is consequently no ventilation between the exhaust gas passage inside 1b and the exhaust gas passage outside 1d. Accordingly, it is possible to suppress leakage of exhaust gas, foreign matter or water to the exhaust gas passage outside 1d.

Second Embodiment

Figure 6:
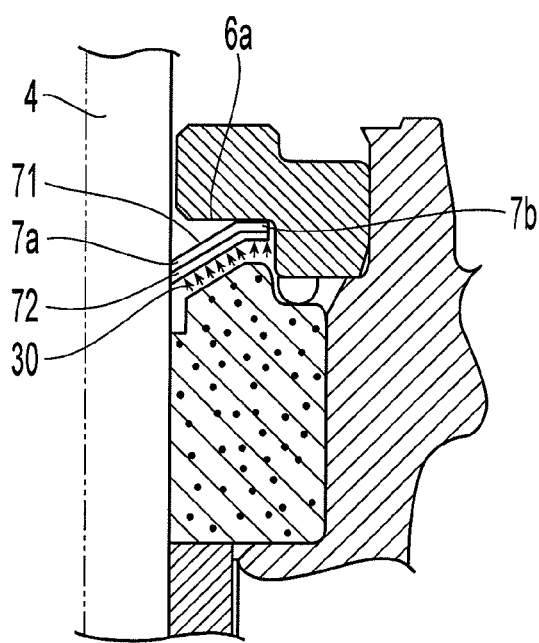
FIG. 6 is an enlarged view of a portion A corresponding to that encircled by the dotted line in FIG. 1 in a valve according to a second embodiment.

FIG. 6 is an enlarged cross-sectional view of a portion A corresponding to that encircled by the dotted line in FIG. 1 in a valve according to a second embodiment.

As shown in FIG. 6, the sealing ability with the shaft 4 is enhanced by increasing the number of seals 7 provided on the upper part of the sliding shaft support component 9 and increasing the thickness of a contact portion (7a) with the shaft 4, thereby leading to a greater wear resistance of the seal inner diameter portion 7a. Consequently, the exhaust gas recirculation valve has a greater durability.

Particularly, when two or more seals are provided, a seal 72 subjected to the pressure 30 and a seal 71 contact with the plane 6a are different, whereby the seal 71 is less likely to undergo local fluctuations or variations in the pressure 30, achieving the stable sealing performance.

Also, the first and second embodiments have the following features.

When a pressure difference between the exhaust gas passage inside and outside 1b-1d occurs, and the pressure 30 from the sliding shaft support portion 9a is exerted onto the lower face of the seal 7, the seal 7b and the plug 6a, as well as the seal 7a and the shaft 4, are intimately contacted, and sealed. For example, when the exhaust gas recirculation valve of the invention is activated for a long time, a wear occurs between the seal 7a and the shaft 4, but if the seal 7 is made of an elastic material, the seal 7 is intimately contacted with the shaft 4 to secure the sealing function, even though the seal inner diameter portion 7a has worn.

Figure 7:
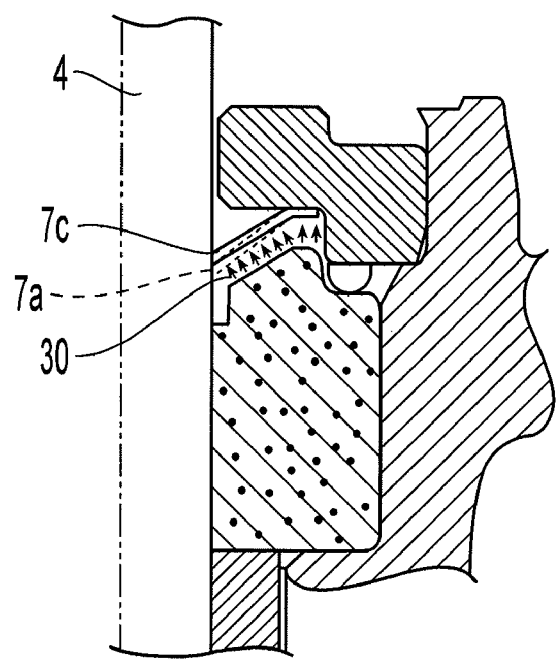
FIG. 7 is an explanatory view for explaining the action situation of a seal when the exhaust gas recirculation valve of the invention is activated for a long time.

Referring to FIG. 7, the second embodiment will be further described.

FIG. 7 is an explanatory view for explaining the action situation of the seal when the exhaust gas recirculation valve of the invention is activated for a long time.

In FIG. 7, at the early time, namely, in a situation where the exhaust gas recirculation valve is not used too much, the seal 7 is in a sealing state as indicated by the broken line, thereby sealing a gap between the seal inner diameter portion 7a and the shaft 4. On the other hand, when the exhaust gas recirculation valve is activated for a long time, namely, in a situation where the seal inner diameter portion 7a has worn, the seal 7 is in a sealing state as indicated by the solid line, thereby sealing a gap between the seal inner diameter portion 7c and the shaft 4.

Herein, though the position of the seal inner diameter portion is changed from 7a to 7c due to wear, the pressure 30 exerted from the sliding shaft support portion 9a is basically equal, whereby the sealing function is not changed. In conclusion, the sealing function is not lost due to wear of the seal inner diameter portion 7a, whereby the sealing performance equivalent to that at the early time (7a) can be achieved in the sealing state (7c) after wear.

This is achieved Because the seal 7 has a conical shape projecting in a direction where the pressure 30 is exerted, whereby a force is applied to the seal in a direction contacting with the shaft 4 due to a pressing force of the pressure 30, thereby preventing a degradation in the sealing performance with the shaft 4 even in a worn state.

Third Embodiment

An assembling procedure will be described with reference to FIG. 1., A filter 5 and the sliding shaft support component 9 are inserted into the housing 1 having a valve seat 2, and the seal 7 is installed. Then, the ring 8 is set and the plug 6 is press fit securely. By press fitting the plug 6, the sliding shaft support component 9 can be also secured.

Then, the shaft 4 connected with an exhaust gas flow control valve 3 is inserted, and a spring 10, a spring holder 11 and a stopper 12 are assembled with the shaft 4.

Figure 8:
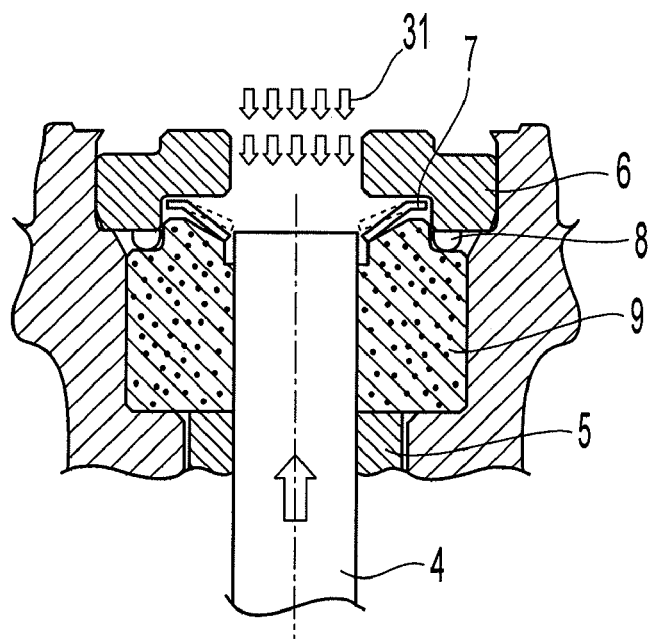
FIG. 8 is an explanatory view for explaining a method for assembling a bearing portion seal structure according to the first and second embodiments.

Referring to FIG. 8, an assembling method of inserting the shaft 4 connected with the exhaust gas flow control valve 3 will be described.

FIG. 8 is an explanatory view for explaining the method for assembling a bearing portion seal structure according to the first and second embodiments.

Since the seal 7 is made of the elastic material as described above, care must be taken so that the seal is not inverted in a direction to the exhaust gas passage outside 1d in inserting the shaft 4. Thus, one assembling method involves applying a positive pressure 31 from a direction of the exhaust gas passage outside 1d, as shown in FIG. 8, for example. Thereby, when the shaft 4 comes closer to the seal 7, the seal is deformed in a direction to the exhaust gas passage inside 1b, as indicated by the solid line in FIG. 8. Then, the shaft 4 is inserted and after insertion, the application of the positive pressure 31 is stopped. Since the seal 7 is singly formed with the seal inner diameter portion 7a along the shaft 4, the seal is made along the shaft 4 by stopping the application of the positive pressure 31, as indicated by the broken line in FIG. 8. With this method using the seal 7 made of elastic material, the poor assembling of the seal 7 is prevented to achieve the inherent sealing function.

The bearing portion sealing structure according to the embodiments comprises the housing having the actuator mounting face and the mounting face on an engine component, the sliding shaft support portion provided inside the housing, and the shaft connected with the flow control valve of the exhaust gas recirculation valve sliding vertically along the sliding shaft support portion, in which the sliding shaft support portion is provided with the seal member, whereby when a flow of exhaust gas occurs inside the exhaust gas passage, the exhaust gas, foreign matter or water is prevented from leaking through the sliding shaft support portion to the exhaust gas passage outside due to a pressure difference between the exhaust gas passage inside and outside.

Also, the seal member provided in the sliding shaft support portion is made of the elastic material so that it may be deformed in accordance with a pressure difference caused between the inside and outside of the exhaust gas passage.

Also, the seal member provided in the sliding shaft support portion is like a doughnut, and a thin plate having a difference in the height between the outer diameter and the inner diameter. By providing the difference in the height, a pressure receiving face is formed for a pressure difference arising between the inside and outside of the exhaust gas passage, whereby the air tightness is improved in accordance with an operating stress.

Also, the plug is provided to keep the air tightness in the seal member installed portion.

Also, the seal member provided in the sliding shaft support portion is not secured rigidly, but supported on the shaft, so that the hole center and the axial center of the seal member are matched to be favorable for wear resistance.

Also, the sliding shaft support component on which the seal member is installed is provided with an undercut portion, or a groove, to prevent the seal member from biting the sliding shaft support portion.

Also, the sliding shaft support component is secured by the plug and the ring, the ring securing the sliding shaft support component, and having a role of preventing exhaust gas, foreign matter or water through the sliding shaft support portion from entering the housing portion.

Also, the seal member provided in the sliding shaft support portion can cope with the required durability by increasing the number of seal members provided, or increasing the thickness of the contact portion with the shaft.

Also, in inserting the shaft into the seal member, a positive pressure is applied from an appropriate direction to easily insert the shaft, resulting in higher assembling ability.

Also, the bearing portion seal structure according to these embodiments can suppress the exhaust gas, foreign matter or water from leaking through the sliding shaft support portion and entering the actuator portion.

Also, since the seal is made of the elastic material, the sealing performance equivalent to that at the early time can be secured even if the seal inner diameter-portion is worn, thereby maintaining the air tightness with the shaft.

Likewise, since the seal is made of the elastic material, the seal is prevented from being hurt and inverted by the method of applying a positive pressure in assembling, whereby the assembling ability is improved, and the intrinsic sealing performance is achieved.

What is claimed is:

1. An exhaust gas recirculation control valve comprising:
a housing;
a shaft with a valve disc for opening or closing an exhaust gas passage, said shaft being disposed within the housing; and
a sliding shaft support component along which said shaft slides,
wherein said sliding shaft support component is provided with at least one seal member, which is a doughnut-shaped plate and is movable and deformable in a certain range,
wherein a plug having a portion with which said seal member makes contact when subjected to a pressure from said exhaust gas passage is provided, and
wherein said seal member is supported on said shaft,
said seal member being made of an elastic member to be deformed according to a pressure difference across said seal member,
said seal member is disposed between said sliding shaft support component and said plug,
said seal member is axially movable as a whole, in response to said pressure difference across said seal member, between a first position physically separated from said portion of said plug and a second position making contact with said portion of said plug.

2. The exhaust gas recirculation control valve according to claim 1, wherein said seal member has a difference in the height between the outer diameter and the inner diameter.

3. The valve according to claim 1, wherein an undercut portion, for preventing the biting of said seal member, is provided on the inner circumference of said sliding shaft support component,
said seal member being positioned over said undercut portion and only a portion of said seal member protruding into said undercut portion.

4. The valve according to claim 1, wherein a ring is provided between said sliding shaft support component and said plug.

5. The valve according to claim 1, wherein said seal member comprises two or more seal sheets laminated.

6. An exhaust gas recirculation control valve comprising:
a housing;
a shaft with a valve disc for opening or closing an exhaust gas passage, said shaft being disposed within the housing; and
a sliding shaft support component along which said shaft slides,
wherein said sliding shaft support component is provided with at least one seal member, which is a doughnut-shaped plate and is movable and deformable in a certain range,
wherein a plug having a portion with which said seal member makes contact when subject to a pressure from said exhaust gas passage is provided, and
wherein said seal member is supported on said shaft,
said seal member is disposed between said sliding shaft support component and said plug,
said seal member is axially movable as a whole, in response to a pressure difference across said seal member, between a first position physically separated from said portion of said plug and a second position making contact with said portion of said plug,
said seal member is movable with respect to a radial direction of said shaft in accordance with a movement with respect to the axial direction, and
said seal member being made of an elastic member to increase deformation according to increase of said pressure difference across said seal member when said seal member is at said second position.

* * * * *